United States Patent [19]

Bissonnett et al.

[11] Patent Number: 4,823,499

[45] Date of Patent: Apr. 25, 1989

[54] BAIT

[75] Inventors: Alan Bissonnett, Lakeville, Mass.; Bernard Engelhardt, 51 Abbeywood Trail, Don Mills, Toronto, Ontario, Canada, M3B 3B4

[73] Assignee: Bernard Engelhardt, Toronto, Canada

[21] Appl. No.: 418,305

[22] Filed: Sep. 15, 1982

[51] Int. Cl.$^4$ .............................................. A01K 69/08
[52] U.S. Cl. ...................................... 43/41; 43/44.99; 43/100
[58] Field of Search ................ 43/44.99, 41, 41.2, 43/42.06, 42.53, 100; 426/1, 805; 424/DIG. 9

[56] References Cited

U.S. PATENT DOCUMENTS

| | | | |
|---|---|---|---|
| 2,607,155 | 8/1952 | Van der Clute | 43/44.99 |
| 2,904,436 | 9/1959 | Auerbach | 426/805 X |
| 3,513,668 | 5/1970 | Mintz | 66/193 |

FOREIGN PATENT DOCUMENTS

| | | | |
|---|---|---|---|
| 2267035 | 11/1975 | France | 43/44.99 |
| 4420380 | 9/1969 | Japan | 426/805 |

*Primary Examiner*—Nicholas P. Godici
*Attorney, Agent, or Firm*—Bachman & LaPointe

[57] ABSTRACT

Bait for crustacea or fish is supported in an elastic casing having orifices to expose the bait to the crustacea; and is disposed in a trap, such as a lobster pot, the bait may be in the form of a frozen block and include a portion of finely divided bait which will initially be released slowly from the casing as the frozen block unfreezes in the ocean, and will later be slowly released as the bait is disturbed by the crustacea, whereby the slow release lures the crustacea or fish to the trap.

21 Claims, No Drawings

BAIT

BACKGROUND OF THE INVENTION

1. Field of the Invention

This invention relates to a bait product and to a method of baiting, more especially the invention is concerned with a bait product for baiting lobsters, crabs, fish and the like.

2. Brief Description of the Prior Art

In order to catch crustacea, for example, lobsters and crabs, a trap is employed which is immersed in the ocean, and which contains bait to entice the crustacea into the trap. The bait is usually in the form of pieces of morsels of fish.

The problem exists of retaining the bait in the trap while at the same time making it sufficiently accessible and exposed to attract the crustacea.

In particular the strong ocean currents and the attacking action of the crustacea tend to dislodge the bait and sweep it out of the trap.

Consequently it becomes necessary to check the traps at regular intervals to ensure that they still contain bait.

On the other hand, if the bait is packaged so as to secure it in the trap, it becomes less accessible and thus less appealing to the crustacea.

It would also be desirable to provide a bait which would release slowly from the trap so as to entice the crustacea to the trap.

SUMMARY OF THE INVENTION it is an object of the invention to provide a method of baiting crustacea or fish, in which the bait can be securely supported in the trap while being wall exposed to lure the crustacea or fish.

It is yet another object of the invention to provide a method of baiting crustacea or fish in which the bait is presented in a fresh condition.

It is yet a further object of the invention to provide a method of baiting crustacea or fish in which a small amount of the bait is released slowly from the trap to lure the crustacea or fish.

It is still another object of the invention to provide a bait product or article, for example, for baiting crustacea, in which the bait is securely housed while being exposed to the crustacea.

It is still another object of the invention to provide a bait product or article, for example, for crustacea, in which the bait is provided in a fresh condition.

It is still yet another object of the invention to provide a bait product or article, for example for crustacea which provides slow release of small amounts of bait.

In accordance with one aspect of the invention there is provided in a method of baiting crustacea or fish in which bait is housed in a trap to lure the crustacea or fish the improvement wherein the bait is supported in an elastic casing having orifices to expose the bait to the crustacea or fish.

In another aspect of the invention there is provided as an article of manufacture, a bait product comprising ground or finely chopped morsels of bait housed in an elastic casing in part or in whole, the causing having orifices effective to expose the bait to crustacea or fish.

In particular the bait is supported in the casing so that the casing is elastically extended around the bait. In this way the casing firmly contacts the bait but if a portion of the bait is released from or pulled from the casing, the extended casing will elastically adjust to accommodate the smaller volume of bait.

DESCRIPTION OF THE PREFERRED EMBODIMENTS

It will be understood that the elastic casing should be of a material which will not distintegrate or degrade when immersed in sea or fresh water, and may be of natural or synthetic material or a combination of materials. On the other hand, a material which will degrade over a long period of time may be advantageous in meeting environmental concerns.

Conveniently the casing may be knitted or woven in an open net-like structure to define the orifices. The casing may, however, also be formed by stamping the orifices in an elastic fabric or sheet, and connecting two opposed edges of the fabric or sheet to provide a casing.

In the case of a knitted or woven casing, it is not necessary that the casing be knitted or woven solely from elasticized material and a combination of elasticized and non-elasticized materials may be employed. It is, of course, necessary that the resulting casing be sufficiently elastic to elastically extend around and contain the bait.

An especially preferred elastic casing is the tubular knitted casing described in U.S. Pat. No. 3,513,668, Marcus Mintz, assigned to Industrial Knitting, Inc., issued May 26, 1970, the teaching and disclosure of which is herein incorporated by reference.

The particular tubular casing described in U.S. Pat. No. 3,513,668 is non-extendible in the longitudinal or axial direction but extendible in the radial and circumferential directions.

In particular, and as described in U.S. Pat. No. 3,513,668, the casing may be in the form of a seamless tubular knitted fabric comprising parallel spaced longitudinal warp wales crochet knit from separate ends and one or more weft ends each extending in a continuous spiral and in engagement with the warp wales, at least some of the loops being free from interengaged weft ends.

The weft end or ends may be laid through the loops of the warp wales, or alternatively, they may be knitted to at least some of the warp ends. The weft end or ends may comprise elastic yarn and a preferred fabric comprises parallel spaced longitudinal warp wales of substantially non-elastic yarn and continuously crochet knitted from separate warp ends, and one or more weft ends of elastic thread each extending in a continuous spiral and in engagement with the warp wales, the fabric comprising net openings defined by groups of successive wale loops free from interengaged weft ends.

The casing may be formed by knitting warp wales downwardly upon a horizontal circular knitting frame having vertically reciprocating needles and continuously interengaging selected loops of the warp wales as they are formed with one or more weft ends fed circumferentially, unselected loops being free from weft courses so as to provide the orifices.

On the other hand, it may also be advantageous in accordance with the invention, to modify the casing as described in U.S. Pat. No. 3,513,668 so that it is extendible in the longitudinal or axial direction, as well as in the radial and circumferential directions. This is readily achieved by employing elastic yarn or thread for both the warp and the weft.

It will be recognized that a wide variety of techniques is available for producing elastic casings such as are envisaged by the invention, such techniques are well known and are not the subject of the present invention. The technique and casing described in U.S. Pat. No. 3,513,668 are merely exemplary of the techniques and casings which may be employed in the practice of the present invention.

The orifice size of the casing is suitably controlled so that it is small enough to prevent any significant loss of bait, but large enough to expose the bait to the crustacea to lure the crustacea thereto.

It is especially convenient to freeze the bait, and to cut the frozen bait into blocks. The blocks may then be encased by the elastic casing.

The bait employed in the invention will usually be a fish bait composed of morsels of pieces of fish, however, the invention is not restricted to a fish bait and any bait material which will entice crustacea or fish may be employed.

Hereinafter, reference is particularly made to fish bait for convenience, however, it is to be understood that other bait materials are nevertheless within the scope of the invention.

When a bait product of the invention comprising a block of frozen bait in an elastic casing is introduced into a trap in the ocean, the block quickly unfreezes to provide a fresh bait to lure the crustacea or fish.

The use of frozen block reduces loss of bait through the orifices of the casing, particularly during transport and handling as well as ensuring that the bait is provided in a fresh form.

The block may conveniently be a rectangular prism measuring about 4 inches × 5 inches × 4 inches.

In an especially important aspect of the invention, the block includes at least a portion of frozen, finely divided fish bait.

In a particular aspect the frozen block may have a sandwich layer construction in which the two outer layers comprise relatively large pieces of fish bait and an inner layer between the outer layers comprises fish bait in a more finely divided form.

As the frozen block freezes, small amounts of the finely divided inner layer are released slowly into the water thus providing a slow release of fish bait to entice the crustacea or fish.

The slow release fish bait represents an especially important aspect of the invention since it provides a bait in which the major portion is retained in the trap, but in which a small amount is released slowly and travels away from the trap so as to lure the crustacea or fish towards the trap.

It will be understood that constructions other than the sandwich construction are possible. Any construction is possible which will permit the finely divided material to be slowly released. In order to achieve this it is advantageous that the finely divided material extend to an outer surface of the block. By employing a sandwich construction, a limited amount of the finely divided fish bait is disposed at the outer surface of the block and the release of finely divided material is slow. As the block unfreezes and finely divided material is released, the outer layers of layer bait pieces are drawn closer together under the action of the elastic casing, and this in turn serves to slow the release of finely divided material.

It is important to realise that after a crustacea has entered the trap it continues to eat, steadily tearing away at the bait. The resultant constant pulling action will cause the inner fine particles to occasionally dislodge and be carried by the currents. It is also important to note that as the crustacea tear away at the casing the fact that it is elastic makes it almost impossible for the casing to tear as it merely stretches as it is pulled and then snaps back or is elastically restored.

The frozen sandwich block may readily be formed by forming a first lower layer of larger fish bait pieces, covering the lower layer with a layer of finely divided fish bait, covering the finely divided layer with a layer of larger bait pieces, freezing the assembly of layers, and cutting the frozen assembly into blocks.

It is understood that traps are typically designed to hold more than one crustacea, for example, they may hold up to 30 or 40 lobsters or crabs. Consequently, the continued slow release of bait is desirable even after a first lobster or the like has entered the trap, to lure other lobsters or the like into the trap. Consequently, while it is preferred to have the finely divided material extend to the outer surface of the bait product so as to provide an initial slow release, it is not essential to do so since the attacking action of the lobster or the like will provide a continued slow release of finely divided material.

Machinery is readily available for applying tubular casings of the type described in U.S. Pat. No. 3,513,668 to blocks of bait in a continuous in-line process.

We claim:

1. In a method of baiting crustacea or fish in which bait is housed in a trap to lure the crustacea or fish, the improvement comprising supporting the bait in a housing consisting of an elastic casing having orifices to expose the bait to the crustacea or fish, the casing comprising an elastic material and being elastically extended around and in contact with the bait, the elastically extended casing being elastically adjustable to continuously contract about the encased bait.

2. A method according to claim 1, wherein the bait is in the form of a frozen block housed in said casing.

3. A method according to claim 1, which comprises providing the elastic casing as a seamless tubular knitted fabric comprising parallel spaced longitudinal warp wales crochet knit from separate ends and one or more weft ends each extending in a continuous spiral and in engagement with the warp wales, at least some of the loops being free from interengaged weft ends.

4. A method according to claim 3, which comprises providing the elastic casing with warp wales which are of substantially non-elastic yarn continuously crochet knitted from separate warp ends, with said one or more weft ends having elastic thread extending in a continuous spiral around the tubular knitted fabric and in interengagement with loops in each of the warp wales, and with mesh openings in the fabric, said mesh openings being defined on one pair of opposed sides by groups of at least 2 successive loops in each of a pair of said warp wales which are adjacent, said successive loops being free from interengagement weft ends, and on another pair of opposed sides by said elastic thread of said warp ends.

5. In a method of baiting crustacea or fish in which bait is housed in a trap to lure the crustacea or fish, the improvement wherein the bait is introduced into the trap in the form of a frozen block supported in a housing consisting of an elastic casing having orifices to expose the bait to the crustacea, a portion of said block comprising frozen finely divided fish bait such that as said block unfreezes, when immersed in water, finely divided fish bait is released slowly from the casing through said orifices to lure the crustacea or fish to the trap, said casing comprising an elastic material and being elastically extended around and in contact with said block, said elastically extended casing being elastically adjustable to continuously contract about the block.

6. In a method of baiting crustacea or fish in which bait is housed in a trap to lure the crustacea or fish, the improvement comprising introducing the bait into the trap in the form of a frozen block, supporting said frozen block in an elastic casing having orifices to expose the bait to the crustacea, a portion of said block comprising frozen finely divided fish bait such that as said block unfreezes, when immersed in water, finely divided fish bait is released slowly from said casing through said orifices to lure the crustacea or fish to the trap, said casing being elastically extended around and in contact with said block, said elastically extended casing being elastically adjustable to contract about the block, said block having a sandwich construction comprising opposed outer layers of larger fish morsels and an intermediate layer of finely divided fish pieces to give a longer release action.

7. A method according to claim 6, which comprises providing the elastic casing as a seamless tubular knitted fabric comprising parallel spaced longitudinal warp wales crochet knit from separate ends and one or more weft ends each extending in a continuous spiral and in engagement with the warp wales, at least some of the loops being free from interengaged weft ends.

8. A method according to claim 7, which comprises providing the elastic casing with warp wales which are of substantially non-elastic yarn continuously crochet knitted from separate warp ends, with said one or more weft ends having elastic thread extending in a continuous spiral around the tubular knitted fabric and in interengagement with loops in each of the warp wales, and with mesh openings in the fabric, said mesh openings being defined on one pair of opposed sides by groups of at least 2 successive loops in each of a pair of said warp wales which are adjacent, said successive loops being free from interengaged weft ends, and on another pair of opposed sides by said elastic thread of said warp ends.

9. A fish bait product comprising a frozen block of morsels of bait supported in a housing consisting of an elastic casing, the casing having orifices effective to expose the bait to crustacea, a portion of said block comprising finely divided fish bait such that as said block unfreezes, when immersed in water, finely divided fish bait is released slowly through said orifices from said casing into the water, said casing comprising an elastic material and being elastically extended around and in contact with said block, said elastically extending casing being elastically adjustable to continuously contrast about the block.

10. A fish bait product comprising a frozen block of morsels of bait supported in an elastic casing, the casing having orifices effective to expose the bait to crustacea, a portion of said block comprising finely divided fish bait such that as said block unfreezes, when immersed in water, finely divided fish bait is released slowly through said orifices from said casing into the water, said casing being elastically extended around and in contact with said block, said elastically extended casing being elastically adjustable to contract about the block, said block having a sandwich construction comprising opposed outer layers of larger fish morsels and an intermediate layer of finely divided fish pieces.

11. A product according to claim 10, wherein said block is in the form of a rectangular prism.

12. A product according to claim 11, wherein said casing is a seamless tubular knitted fabric comprises parallel spaced longitudinal warp wales crochet knit from separate ends and one or more weft ends each extending in a continuous spiral and in engagement with the warp wales, at least some of the loops being free from interengaged weft ends.

13. A product according to claim 12, wherein said warp wales are of substantially non-elastic yarn continuously crochet knitted from separate warp ends, and said one or more weft ends are of elastic thread extending in a continuous spiral around the tubular knitted fabric and in interengagement with loops in each of the warp wales, mesh openings in the fabric said mesh openings being defined on one pair of opposed sides by groups of at least 2 successive loops in each of a pair of said warp wales which are adjacent, said successive loops being free from interengaged weft ends, and on another pair of opposed sides by said elastic thread of said warp ends.

14. A bait product comprising morsels of bait supported in a housing consisting of an elastic casing, the casing having orifices effective to expose the bait to crustacea or fish, a portion of said bait comprising finely divided bait slowly releasable from said product when immersed in water, said casing comprising an elastic material and being elastically extended around and in contact with the bait, said elastically extended casing being elastically adjustable to contract about the encased bait.

15. A bait product comprising morsels of bait supported in an elastic casing, the casing having orifices effective to expose the bait to crustacea or fish, a portion of said bait comprising finely divided bait slowly releasable from said product when immersed in water, said casing being elastically extended around and in contact with the bait, said elastically extended casing being elastically adjustable to contract about the encased bait, said finely divided bait being substantially surrounded by larger morsels, said finely divided bait being releasable on disturbance of said product by crustacea or fish.

16. A fish bait product comprising a frozen block of morsels of bait supported in an elastic casing, the casing having orifices effective to expose the bait to crustacea, a portion of said block comprising finely divided fish bait such that as said block unfreezes, when immersed in water, finely divided fish bait is released slowly from said casing into the water, said block having a sandwich construction comprising opposed outer layers of larger fish morsels and an intermediate layer of finely divided fish pieces.

17. A product according to claim 16, wherein the casing is elastically extended around and in contact with the bait.

18. A product according to claim 17, wherein said block is in the form of a rectangular prism.

19. A product according to claim 17, wherein said casing is a seamless tubular knitted fabric comprising parallel spaced longitudinal warp wales crochet knit from separate ends and one or more weft ends each extending in a continuous spiral and in engagement with the warp wales, at least some of the loops being free from interengaged weft ends.

20. A product according to claim 19, which comprises providing the elastic casing with warp wales which are of substantially non-elastic yarn continuously crochet knitted from separate warp ends, with said one or more weft ends having elastic thread extending in a continuous spiral around the tubular knitted fabric and in interengagement with loops in each of the warp wales, and with mesh openings in the fabric said mesh openings being defined on one pair of opposed sides by groups of at least 2 successive loops in each of a pair of said warp wales which are adjacent, said successive loops being free from interengaged weft ends, and on another pair of opposed sides by said elastic thread of said warp ends.

21. A bait product comprising morsels of bait supported in an elastic casing, the casing having orifices effective to expose the bait to crustacea or fish, a portion of said bait comprising finely divided bait slowly releasable from said product when immersed in water, said finely divided bait being substantially surrounded by larger bait morsel and releasable on disturbance of said product by crustacea or fish.

* * * * *